US011268883B2

(12) United States Patent
Kawasaki et al.

(10) Patent No.: US 11,268,883 B2
(45) Date of Patent: Mar. 8, 2022

(54) DATA PROCESSING DEVICE AND DATA PROCESSING METHOD

(71) Applicant: HITACHI, LTD., Tokyo (JP)

(72) Inventors: Kenji Kawasaki, Tokyo (JP); Hidenori Yamamoto, Tokyo (JP); Takeshi Handa, Tokyo (JP); Takashi Tsuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/056,909

(22) PCT Filed: Mar. 13, 2019

(86) PCT No.: PCT/JP2019/010430
§ 371 (c)(1),
(2) Date: Nov. 19, 2020

(87) PCT Pub. No.: WO2019/225125
PCT Pub. Date: Nov. 28, 2019

(65) Prior Publication Data
US 2021/0302276 A1 Sep. 30, 2021

(30) Foreign Application Priority Data

May 22, 2018 (JP) .............................. JP2018-098282

(51) Int. Cl.
G01M 99/00 (2011.01)
G01M 17/08 (2006.01)
(52) U.S. Cl.
CPC ............ *G01M 99/00* (2013.01); *G01M 17/08* (2013.01)
(58) Field of Classification Search
CPC .............................. G01M 99/00; G01M 17/08
(Continued)

(56) References Cited

U.S. PATENT DOCUMENTS 5,532,943 A * 7/1996 Asano ..................... G01N 15/12
382/133
7,716,012 B2 * 5/2010 Bickel ....................... G01D 3/10
702/179

(Continued)

FOREIGN PATENT DOCUMENTS

JP 2013041173 A 2/2013
JP 2017068748 A 4/2017

OTHER PUBLICATIONS

International Search Report for related PCT App No. PCT/JP2019/010430 dated Jun. 18, 2019, 7 pgs.

*Primary Examiner* — Ricky Go
(74) *Attorney, Agent, or Firm* — Procopio, Cory, Hargreaves & Savitch LLP

(57) ABSTRACT

Provided are: a past relation identification unit that combines past sensor data with job data based on information on an item relating to data combination, and identifies a data relation between items based on an item of the past sensor data and an item of the job data; a real-time relation identification unit that identifies a data relation between items of real-time sensor data; a similarity calculation unit that calculates a similarity between the data relation identified by the past relation identification unit and the data relation identified by the real-time relation identification unit; and an output controller that outputs the data relation identified by the past relation identification unit and the data relation identified by the real-time relation identification unit while associating with each other by the item of the past sensor data and the item of the real-time sensor data, the similarity between those data relations exceeding a threshold, the similarity being calculated by the similarity calculation unit.

6 Claims, 11 Drawing Sheets

(58) Field of Classification Search
USPC .......................................................... 702/180
See application file for complete search history.

(56) References Cited

U.S. PATENT DOCUMENTS

| | | | |
|---|---|---|---|
| 2005/0254712 A1* | 11/2005 | Lindeman | G06K 9/00 |
| | | | 382/224 |
| 2008/0183423 A1* | 7/2008 | Ide | G06K 9/6253 |
| | | | 702/180 |
| 2017/0097980 A1 | 4/2017 | Ishii et al. | |

* cited by examiner

| TABLE NAME | VALID TIME | COMBINATION KEY |
|---|---|---|
| RAILWAY DELAY MANAGEMENT TABLE | 5 MINUTES | TRAIN NUMBER, DATE AND TIME |
| OPERATION MANAGEMENT EVENT TABLE | 30 MINUTES | DATE AND TIME |
| ... | ... | |

| ITEM NAME | TYPE | PERIOD |
|---|---|---|
| SPEED | REAL TIME | LAST 5 MINUTES |
| VIBRATION | REAL TIME | LAST 5 MINUTES |
| ... | ... | ... |
| SPEED | PAST | 2015/01/01 00:00:00-2015/12/31 23:59:59 |
| VIBRATION | PAST | 2015/01/01 00:00:00-2015/12/31 23:59:59 |
| ... | ... | ... |
| DELAY TIME | PAST | 2015/01/01 00:00:00-2015/12/31 23:59:59 |
| EVENT | PAST | 2015/01/01 00:00:00-2015/12/31 23:59:59 |

PAST SENSOR DATA

JOB DATA

| ITEM ID | ITEM NAME | TYPE | VALUE RANGE |
|---|---|---|---|
| 101 | DATE AND TIME | PAST | 4/5 12:00-12:02 |
| 102 | TRAIN NUMBER | PAST | A01 |
| 103 | TRAIN NUMBER | PAST | B24 |
| 104 | SPEED | PAST | 10-30km/h |
| 105 | SPEED | PAST | 30-50km/h |
| 106 | VIBRATION | PAST | 50-70mm |
| 107 | DELAY TIME | PAST | 10-15 MINUTES |
| ... | ... | ... | ... |
| 201 | TRAIN NUMBER | REAL TIME | A01 |
| ... | ... | ... | ... |

620

| START POINT | END POINT | LINK KIND | VALUE |
|---|---|---|---|
| ... | ... | ... | ... |
| 105 | 106 | CO-COOCCURRENCE | 0.7 |
| 105 | 107 | CO-COOCCURRENCE | 0.6 |
| 106 | 107 | CO-COOCCURRENCE | 0.8 |
| ... | ... | ... | ... |

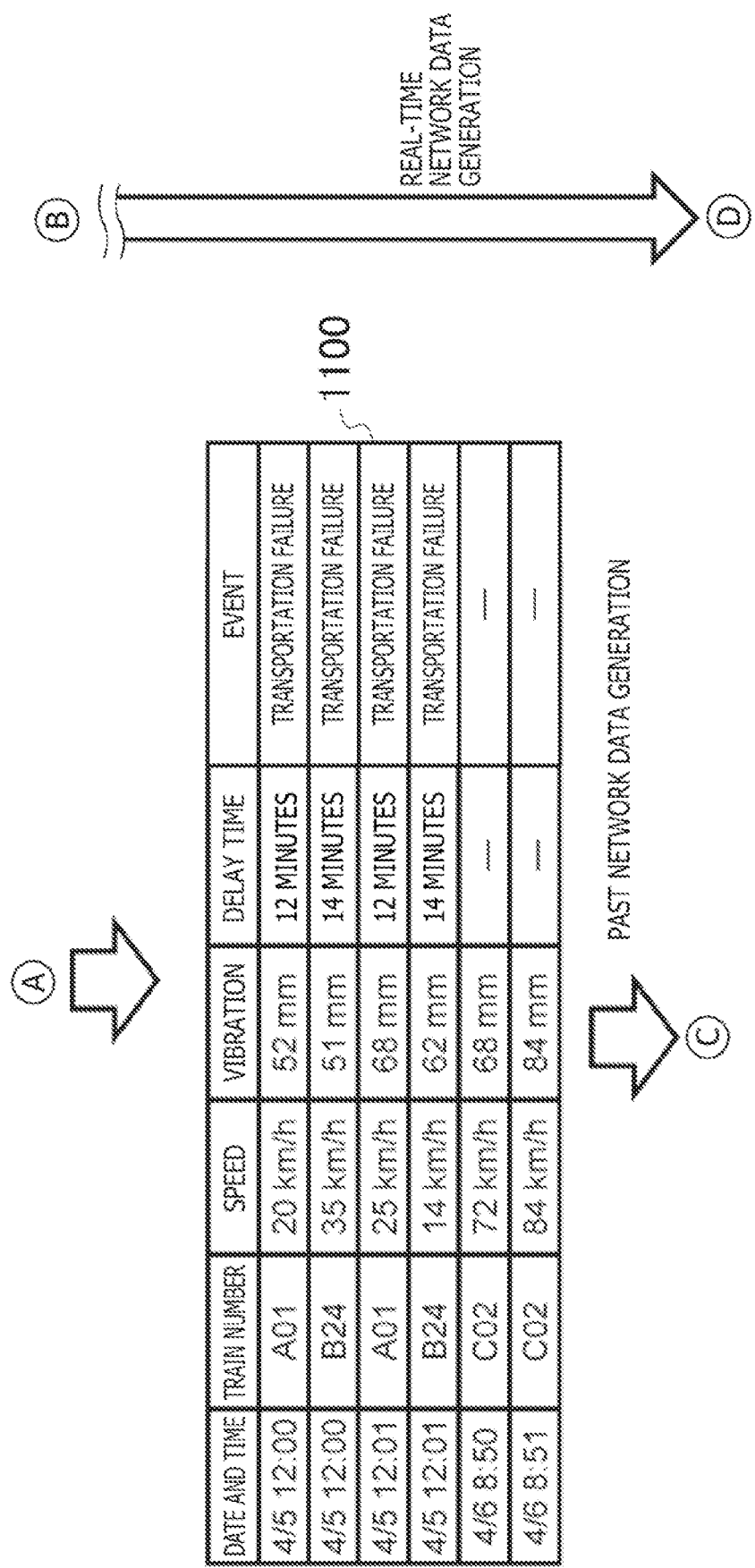

DATA PROCESSING DEVICE AND DATA PROCESSING METHOD

TECHNICAL FIELD

The present invention relates to a data processing device and a data processing method, and is suitably applied to a data processing device and a data processing method that process sensor data, for example.

BACKGROUND ART

In recent years, an attempt for analyzing data held in a job system to, for example, reduce job cost and improve service has been progressing. Furthermore, due to evolution of an IoT (Internet of Things) technology such as sensors and networks, it has been possible that everything is connected to a network, and data is sensed in real time.

Recently, there is a need in which data is analyzed to contribute to abnormality detection of a system and improvement of accuracy of failure prediction.

For example, there is disclosed a technique that generates a correlation data string of each parameter pair for each parameter group including a plurality of parameters, calculates a distance between correlation data strings of each parameter pair of the parameter group in a case where a parameter pair including a correlation coefficient exceeding a threshold is detected, identifies a parameter common to two correlation data strings having the shortest distance as a cause parameter, and predicts failure occurrence due to data abnormality of the cause parameter (refer to Patent Document 1).

Furthermore, for example, there is disclosed a technique that improves detection accuracy of an abnormal state of a system by generating correlation information indicating correlation of a temporal change in values between a plurality of items with respect to each of a plurality of unit periods based on information indicating a temporal change in the plurality of unit periods of values of the plurality of items indicating a stats of a system to be managed, calculating similarities between a plurality of pieces of correlation information of each of the plurality of unit periods, and clustering the plurality of pieces of correlation information based on the calculated similarities (refer to Patent Document 2).

PRIOR ART DOCUMENT

Patent Documents

Patent Document 1: JP-2013-41173-A
Patent Document 2: JP-2017-66748-A

SUMMARY OF THE INVENTION

Problem to be Solved by the Invention

The information processing devices described in Patent Documents described above provide a method for performing data processing focusing on a change in a correlation between data items. Particularly, in a case where a lot of data items are present, to grasp a transition of a data value of each data item is a great burden for a data analyzing person, and therefore a method for focusing on a change in a correlation between the data items and presenting only a changed portion is useful.

On the other hand, there is a case where estimation of a cause of the change is difficult only with the change in the correlation between the data items. For example, in a case of a real-time monitoring system of a state of a train, based on a change in a correlation between data items of various kinds of sensors (e.g., a speed sensor, a noise sensor, and a vibration sensor) mounted on the train, although a value of the speed sensor and a value of the noise sensor have a strong positive correlation in a normal time, in a case where the value of the noise sensor increases and the correlation decreases regardless of the value of the speed sensor in a certain time, this change can be presented. However, it is difficult to estimate a cause of the increased value of the noise sensor only with the data items.

The present invention is made in consideration of the above point, and proposes a data processing device, a data processing method, and the like capable of estimating a cause of a change in a data relation.

Means for Solving the Problem

For solving such a problem, the present invention is provided with a past relation identification unit that combines past sensor data with job data based on information on an item relating to data combination, and identifies a data relation between items based on an item of the past sensor data and an item of the job data, a real-time relation identification unit that identifies a data relation between items of real-time sensor data, a similarity calculation unit that calculates a similarity between the data relation identified by the past relation identification unit and the data relation identified by the real-time relation identification unit, and an output controller that outputs the data relation identified by the past relation identification unit and the data relation identified by the real-time relation identification unit while associating with each other by the item of the past sensor data and the item of the real-time sensor data, the similarity between the data relation identified by the past relation identification unit and the data relation identified by the real-time relation identification unit exceeding a threshold, the similarity being calculated by the similarity calculation unit.

The present invention is provided with a first step of, by a past relation identification unit, combining past sensor data with job data based on information on an item relating to data combination, and identifying a data relation between items based on an item of the past sensor data and an item of the job data, a second step of, by a real-time relation identification unit, identifying a data relation between items of real-time sensor data, a third step of, by a similarity calculation unit, calculating a similarity between the data relation identified by the past relation identification unit and the data relation identified by the real-time relation identification unit, and a fourth step of, by an output controller, outputting the data relation identified by the past relation identification unit and the data relation identified by the real-time relation identification unit while associating with each other, by the item of the past sensor data and the item of the real-time sensor data, the similarity between the data relation identified by the past relation identification unit and the data relation identified by the real-time relation identification unit exceeding a threshold, the similarity being calculated by the similarity calculation unit.

According to the above-described configuration, for example, the data relation between items identified based on the past sensor data and the job data and the data relation between items identified based on real-time sensor data are output while being associated with each other, whereby a cause of a change in the data relation can be estimated by grasping a correspondence relation between the real-time sensor data and the job data.

Advantages of the Invention

According to the present invention, reliability of data analysis can be enhanced.

BRIEF DESCRIPTION OF THE DRAWINGS

FIG. 3 is a diagram illustrating an example of a job data definition table according to the first embodiment.

FIG. 4 is a diagram illustrating an example of an obtaining data item definition table according to the first embodiment.

FIG. 6 is a diagram illustrating an example of a network data table group according to the first embodiment.

MODE FOR CARRYING OUT THE INVENTION

Hereinafter, an embodiment of the present invention will be described with reference to attached drawings. In the present embodiment, a case where a state of a train is monitored in real time will be described as an example.

(1) First Embodiment

Figure 1:
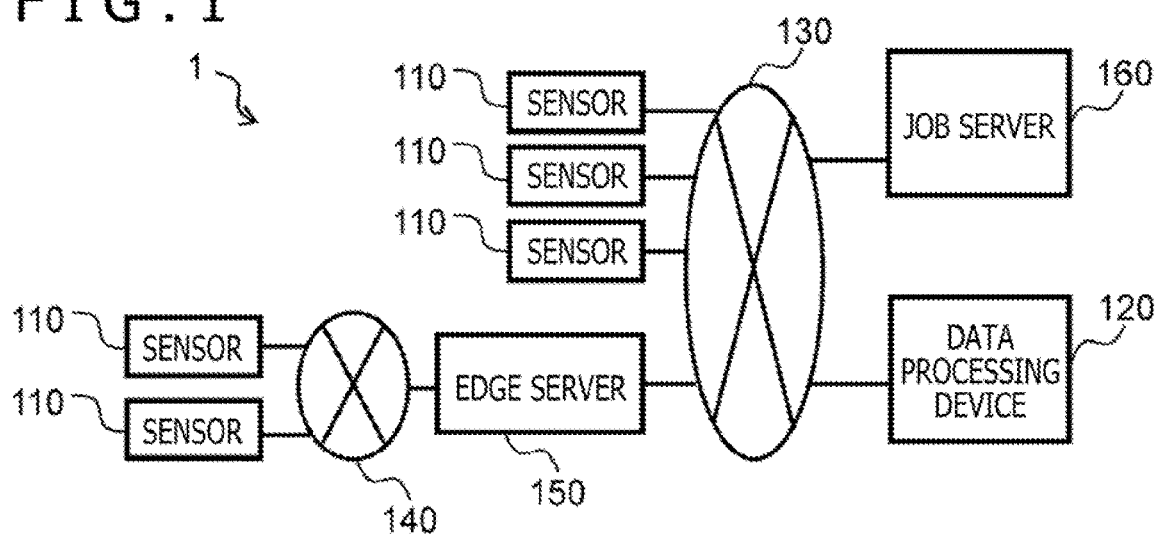
FIG. 1 is a diagram illustrating an example of a configuration of a data processing system according to a first embodiment.

In FIG. 1, 1 illustrates a data processing system according to a first embodiment as a whole. In the data processing system 1, each sensor 110 is a sensor capable of measuring state quantity such as a position, vibration, heat, or sound of a natural phenomenon or an artificial object, and outputting data. One or more sensors 110 are disposed. The sensors 110 are communicably connected to a data processing device 120. For example, the sensors 110 may directly be connected to the data processing device 120, may be connected to the data processing device 120 through a network 130, or may be connected to an edge server 150 through a personal area network 140 such as infrared communication or near field communication, and further connected to the data processing device 120 through the network 130.

The data processing device 120 performs data processing using data (sensor data) indicating the state quantity obtained by the sensors 110 and data (job data) relating to various kinds of jobs obtained by a job server 160 as inputs, and outputs a result of the data processing.

The edge server 150 performs, for example, communication processing between the sensors 110 and primary processing of the sensor data, and reduces a network bandwidth to aggregate the sensor data in the data processing device 120. Further, for example, the edge server 150 performs processing whose load is heavy in the sensors 110 to achieve fast processing regardless of performance of the sensors 110, and performs real-time communication with the data processing device 120. The edge server 150 is suitably disposed at a location physically close to the sensors 110.

The job server 160 accumulates job data. One or more job servers 160 are disposed. Each job server 160 is communicably connected to the data processing device 120. Each job server 160 is connected to the data processing device 120 through, for example, the network 130.

Herein, in the present embodiment, a configuration in which the job data is input into the data processing device 120 through the network 130 is described as an example. However, the present embodiment is not limited to this configuration. A configuration in which the job data is input into the data processing device 120 offline through a recording medium such as portable hard disk, a USB (Universal Serial Bus) memory, or a DVD (Digital Versatile Disc) may be used.

Note that the data processing device 120, the edge server 150, and the job server 160 can be implemented by a computer such as a personal, computer, a mobile computer, a workstation, a mobile phone, or a smartphone.

Figure 2:
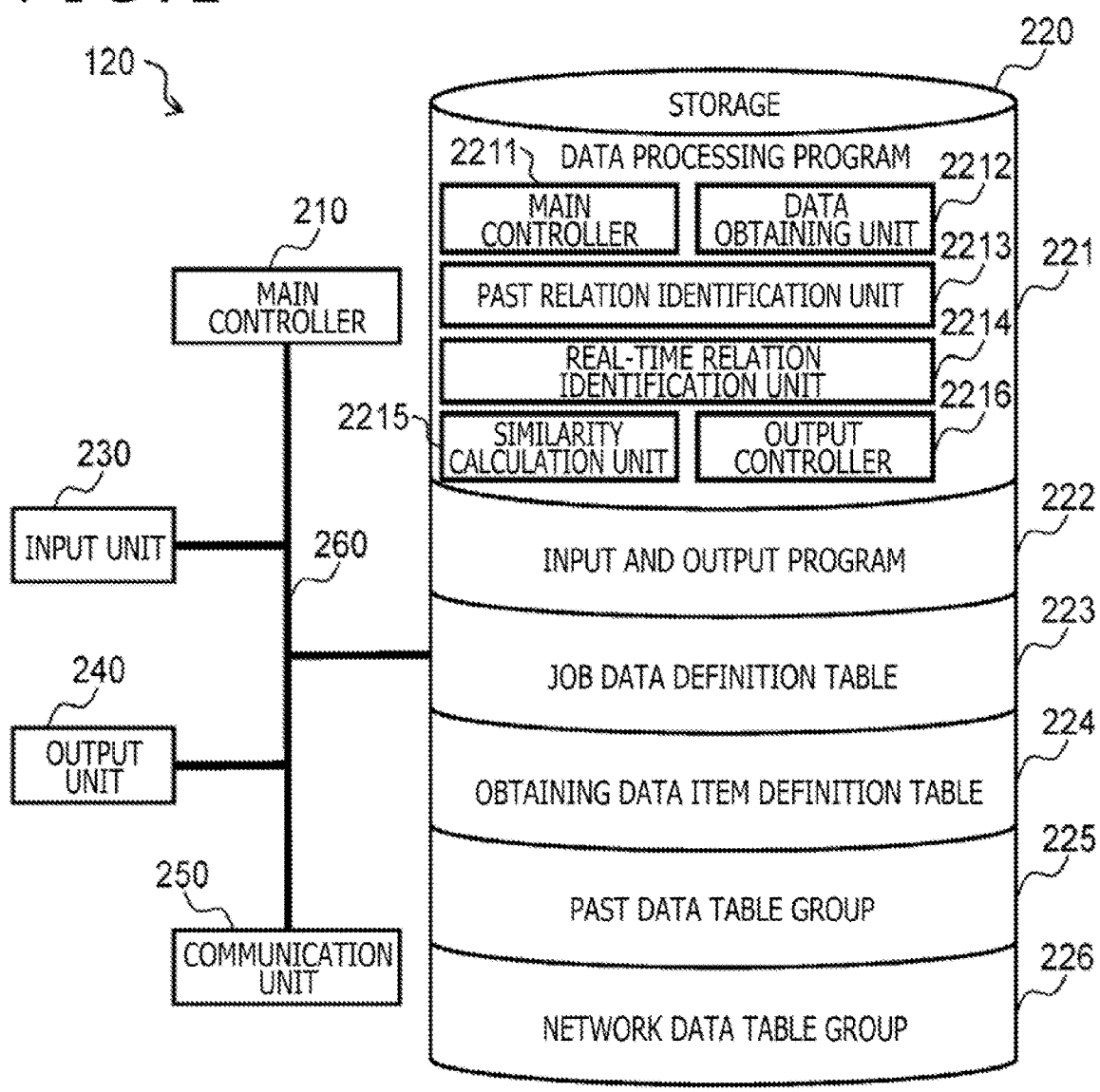
FIG. 2 is a diagram illustrating an example of a configuration of a data processing device according to the first embodiment.

FIG. 2 is a diagram illustrating an example of a configuration of the data processing device 120. The data processing device 120 includes a main controller 210, a storage 220, an input unit 230, an output unit 240, and a communication unit 250. The main controller 210, the storage 220, the input unit 230, the output unit 240, and the communication unit 250 exchange data through a communication line 260 (internal bus).

The main controller 210 is, for example, a CPU (Central Processing Unit), and performs control of hardware or execution processing of a program. The storage 220 is, for example, a RAM (Random Access Memory), a ROM (Read Only Memory), an HDD (Hard Disk Drive), or a flash memory, and stores various programs (a data processing program 221 and an input and output program 222), various data (a job data definition table 223, an obtaining data item definition table 224, a past data table group 225, a network data table group 226, and the like).

For example, functions (a main controller 2211, a data obtaining unit 2212, a past relation identification unit 2213, a real-time relation identification unit 2214, a similarity calculation unit 2215, an output controller 2216, and the like) of the data processing device 120 may be implemented by the CPU while reading the programs stored in the ROM (software) to the RAM and executing the programs, may be implemented by hardware such as a dedicated circuit, or may be implemented by a combination of software and hardware. Alternatively, a part of the functions of the data processing device 120 may implemented by another computer communicable with the data processing device 120.

The main controller 2211 receives various instructions issued by a data analyzing person through the input unit 230, or outputs a result of the data processing to the output unit 240.

The data obtaining unit 2212 obtains sensor data of the sensors 110 in real time to store the sensor data in the storage 220, or reads information stored in the storage 220.

The past relation identification unit 2213 combines past sensor data with job data based or information on items relating to data combination (e.g., job data definition table 223). Further, the past relation identification unit 2213 identifies a data relation between items (generates past network data described later, for example) based on items of the past sensor data and items of the job data.

The real-time relation identification unit 2214 identifies a data relation between items of real-time sensor data (generates real-time network data described later, for example).

The similarity calculation unit 2215 calculates a similarity between the data relation identified by the past relation identification unit 2213 and the data relation identified by the real-time relation identification unit 2214.

The output controller 2216 outputs (issues an instruction to the main controller 2211 to perform display by a display device, printing by a printer, transmission by an electronic mail, output of a file, or output of sound, for example) the data relation identified by the past relation identification unit 2213 and the data relation identified by the real-time relation identification unit 2214 while associating with each other by the items of the past sensor data and the items of the real-time sensor data, the similarity between those data relations exceeding a threshold and being calculated by the similarity calculation unit 2215.

The input unit 230 is, for example, a keyboard or a pointing device, and receives an input such as an instruction to start execution of a program or an instruction to stop the execution of the program, the instruction being issued by a system administrator or the data analysis person. The output unit 240 is, for example, a display or a speaker, and outputs an execution state of the program, for example. Note that the input unit 230 and the output unit 240 may be achieved with a device in which the input unit 230 and the output unit 240 are integrated into one body (e.g., touch panel). The communication unit 250 is configured with, for example, an NIC (Network Interface Card), and performs data communication with another computer.

Next, data used for the data processing in the data processing device 120 will be described with reference to FIGS. 3 to 6.

FIG. 3 is a diagram illustrating an example of the job data definition table 223. In the job data definition table 223, pieces of information on a table name, a valid time, and a combination key are stored while feeing associated with each other.

The table name indicates a name of a table that stores the job data (job data table). The valid time indicates a time range (predetermined time width) for defining the past, sensor data to be valid upon combining the job data table with a table that stores the past sensor data (past sensor data table). The combination key indicates an item used to combine the job data table and the past sensor data table.

FIG. 4 is a diagram illustrating an example of the obtaining data item definition table 224. In the obtaining data item definition table 224, pieces of information on an item name, a type, and a period are stored while being associated with each other.

The item name indicates a name of an item of sensor data obtained in real time (real-time sensor data) or the past data (the past sensor data and the job data). The type indicates a type indicating the real-time sensor data or the past data. The period indicates a period necessary for the data analyzing person to perform analysis.

Note that, in the obtaining data item definition table 224, information on the past data may not be stored, for example. Alternatively, for example, in the obtaining data item definition table 224, all item names of the past data may be defined as an analysis target, and only the period may be registered individually or singularly as a whole.

Figure 5:
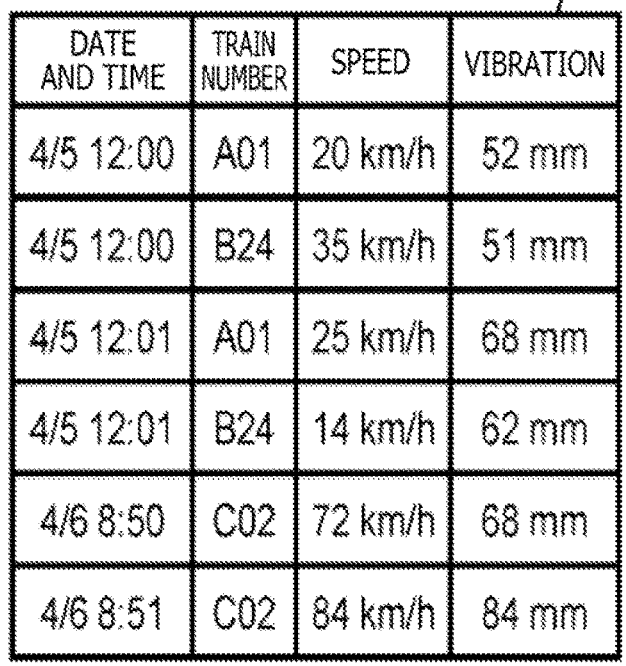
FIG. 5 is a diagram illustrating an example of a past data table group according to the first embodiment.
Figure 5:
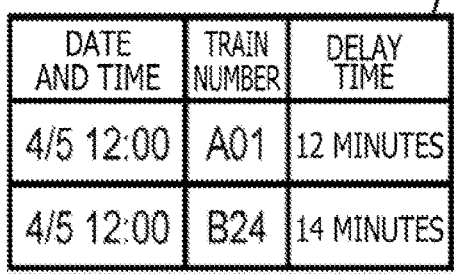
Figure 5:
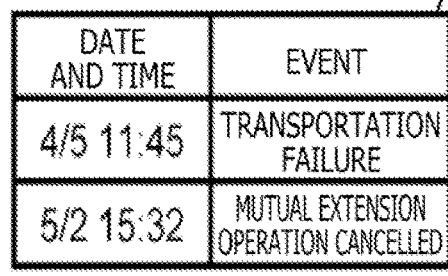

FIG. 5 is a diagram illustrating an example of the past, data table group 225 that stores the past data.

The past data table group 225 includes, for example, a train sensor table 510 that stores the past sensor data, and a railway delay management table 520 and an operation management event table 530 that store the job data.

In the train sensor table 510, pieces of information on a date and time, a train number, a speed, and vibration are stored while being associated with each other. The date and time indicates a date and time relating to the sensor data (e.g., a date and time when the sensor data is obtained, a date and time when the sensor data is received, or a date and time when the sensor data is stored). The train number indicates a number of a train. The speed indicates a speed of a train. The vibration indicates vibration of a train.

In the railway delay management table 520, pieces of information on a data and time, a train number, a delay time are stored while being associated with each other. The date and time indicates a date and time relating to the job data (e.g., a date and time when the job data is obtained, a date and time when the job data is received, or a date and time when the job data is stored). The train number indicates a number of a train. The delay time indicates a time by which a train is delayed.

In the operation management event table 530, pieces of information on a date and time, and an event are stored while being associated with each other. The date and time indicates a date and time relating to an event (e.g., a date and time when information on an event is obtained, a date and time when information on an event is received, or a date and time when information on an event is stored). The event indicates an event relating to a train.

FIG. 6 is a diagram illustrating an example of the network data table group 226 that stores network data capable of generating a network graph. In the network data table group 226, for example, a node information table 610 and a link information table 620 are included.

Figure 10:
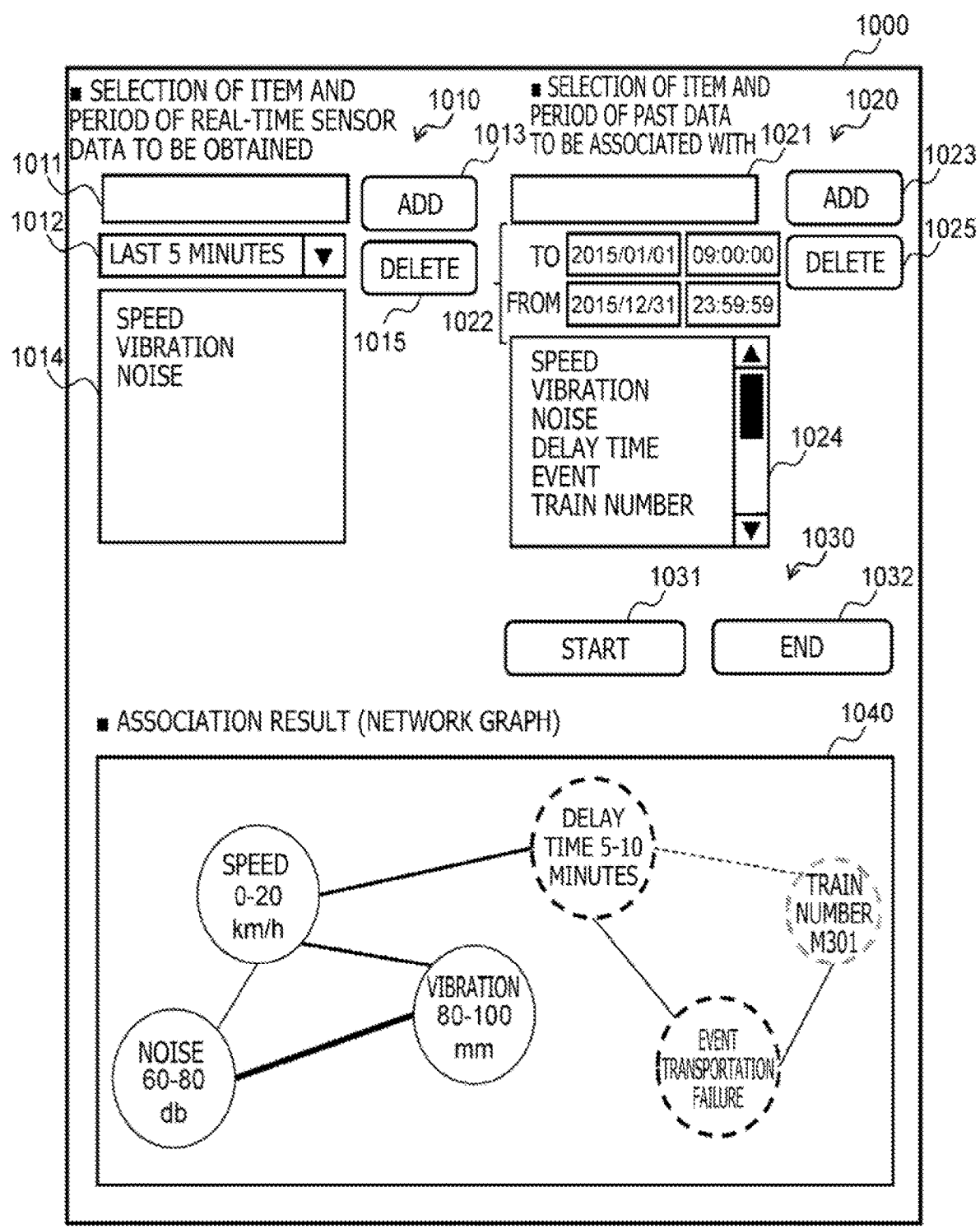
FIG. 10 is a diagram illustrating an example of a data analysis screen according to the first embodiment.

The network graph is a graph representing connection between items as a link while defining the item of data as a node. Note that an example of the network graph is illustrated in FIG. 10.

In the node information table 610, pieces of information on an item ID, an item name, a kind, and a value rage are stored while being associated with each other.

The item ID indicates an ID capable of discriminating the item serving as the node in the network graph. The item name indicates a name of the item serving as the node in the network graph. The kind indicates a kind of the node in the network graph (the item of the past data or the item of the real-time sensor data). The value range indicates a value range in which a co-occurrence relation occurs in a case where the connection between the nodes represents the co-occurrence relation. Note that, for the item ID, an ID unique to each node is assigned and registered.

In the link information table 620, pieces of information on a start point, an end point, a link kind, and a value are stored while being associated with each other.

The start point indicates an item ID of the node (item) serving as a start point of the link. The end point indicates an item ID of the node (item) serving as an end point of the link. The link kind indicates a kind of the link (the co-occurrence relation or a correlation). The value indicates strength of the link (a value of co-occurrence or a value of correlation).

Next, processing performed by the data processing system 1 will be described with reference to FIGS. 7 to 5.

Figure 7:
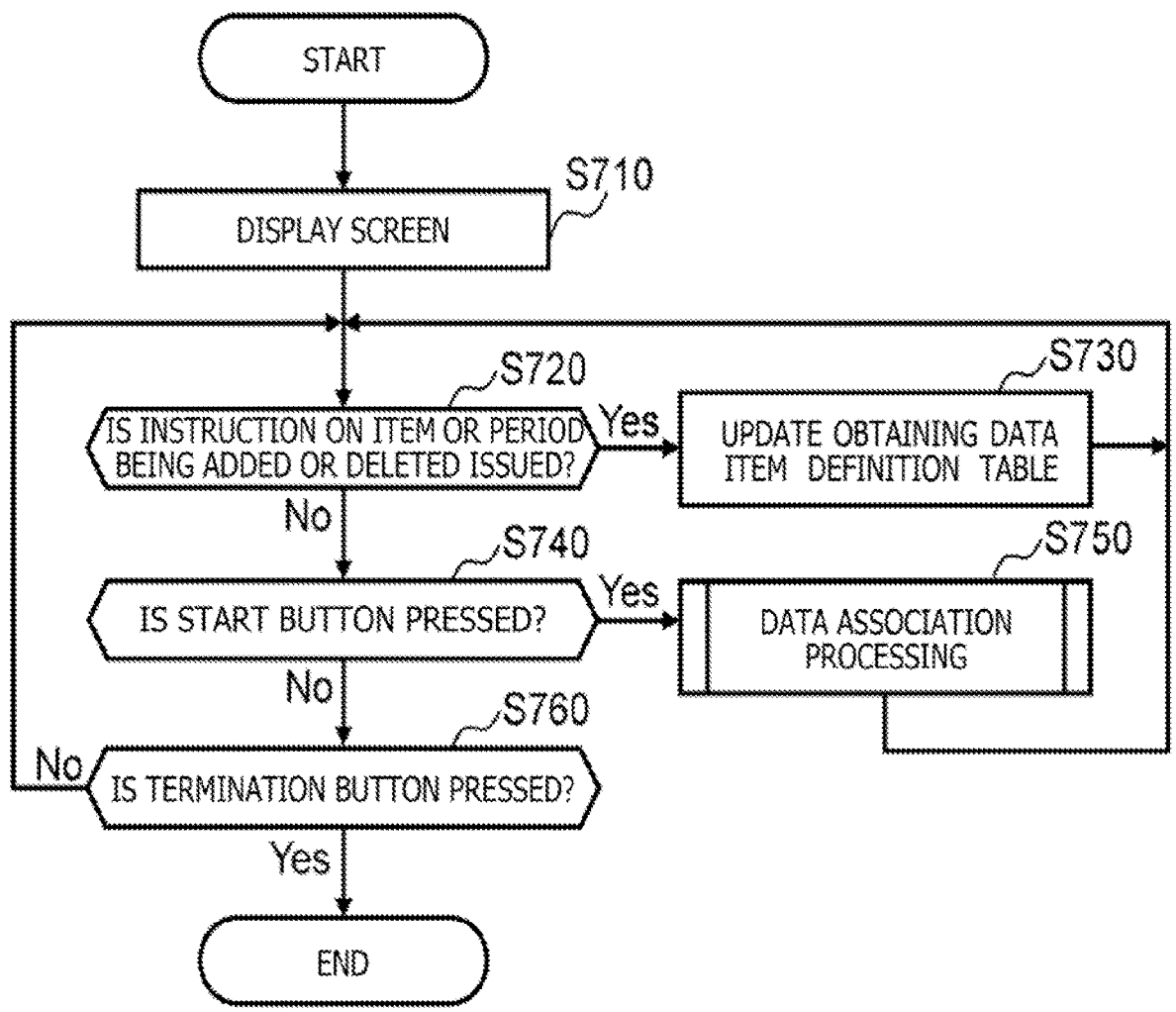
FIG. 7 is a diagram illustrating an example of a processing procedure relating to main processing according to the first embodiment.

FIG. 7 is a diagram illustrating an example of a processing procedure relating to main processing. In the main processing, the data analyzing person performs setting for performing predetermined analysis, or starts the data processing based on the setting to output a result of the data processing.

The main controller 2211 displays, in the output unit 240, a screen (data analysis screen) used for receiving an input of the setting relating to the data processing, or displaying the result of the data processing (step S710).

Herein, the data analysis screen will be described with reference to FIG. 10. FIG. 10 is a diagram illustrating an example of the data analysis screen (hereinafter, a data analysis screen 1000 will be described as an example).

The data analysis screen 1000 includes a real-time sensor data setting section 1010 for setting (adding, deleting, and the like) the item and the period of the real-time sensor data to be obtained, a past data setting section 1020 for setting (adding, deleting, and the like) the item and the period of the past data to be associated with the real-time sensor data, an instruction section 1030 for issuing instruction on start of the data processing, termination of the data analysis, and the like, and a result display section 1040 for displaying the result of the data processing.

In the real-time sensor data setting section 1010, a targeted item is input into a text box 1011, a targeted period is selected from a list 1012, and an addition button 1013 is pressed, whereby the setting of the real-time sensor data is updated, and set contents (setting contents) are displayed in a setting content list 1014. Further, the setting contents to be deleted are selected in the setting content list 1014, and a deletion button 1015 is pressed, whereby the setting of the real-time sensor data is updated. Note that the updated setting contents are reflected on the obtaining data item definition table 224.

In the past data setting section 1020, a targeted item is input into a text box 1021, a targeted period is input into a text box 1022, and an addition button 1023 is pressed, whereby the setting of the past data is updated, and set contents (setting contents) are displayed in a setting content list 1024. Further, the setting contents to be deleted are selected in the setting content list 1024, and a deletion button 1025 is pressed, whereby the setting of the past data is updated. Note that the updated setting contents are reflected on the obtaining data item definition table 224.

The instruction section 1030 includes a start button 1031 for issuing instruction on start of processing for associating the real-time sensor data with the job data (data association processing) and a termination button 1032 for issuing instruction on termination of the data analysis (for closing the data analysis screen 1000).

The result display section 1040 displays a result of the association processing (association result) as the network graph, whereby the data analyzing person can grasp the job data associated with the real-time sensor data. This facilitates an analysis operation.

Subsequently, the main controller 2211 determines whether the data analyzing person issues instruction to change the setting (whether the instruction on item being added or deleted is issued, or whether the instruction on period being added or deleted is issued) (step S720). The main controller 2211 shifts the processing to step S730 in a case where determination in which the instruction on the change of the setting is issued is made, and shifts the processing to step S740 in a case where determination in which the instruction on the change of the setting is not issued made.

In step S730, the main controller 2211 updates the obtaining data item definition table 224 with the updated setting contents, and shifts the processing to step S720.

In step S740, the main controller 2211 determines whether the start button 1031 is being pressed. The main controller 2211 shifts the processing to step S750 in a case where determination in which the start button 1031 is being pressed is made, and shifts the processing to step S760 in a case where determination in which the start button 1031 is not being pressed is made.

In step S750, the data association processing is performed, and the processing is shifted to step S720. Note that the data association processing will be described later with reference to FIG. 8.

In step S760, the main controller 2211 determines whether the termination button 1032 is pressed. The main controller 2211 closes (erases) the data analysis screen 1000 to terminate the main processing in a case where determination in which the termination button 1032 is pressed is made, and shifts the processing to step S720 in a case where determination in which the termination button 1032 is not pressed is made.

Note that, in the main processing, during a period in which the start button 1031 is being pressed, step S750 is repeatedly executed in a periodic manner (for each predetermined time). This enables continuous display of the relation between items of the real-time sensor data and the job data. In a case where the items associated with each other, the strength of the link, and the like are changed from previous execution, the change may be highlighted with an animation, or may be highlighted by changing, for example, a color or a shape of an icon. With such a configuration, the data analyzing person can quickly and accurately grasp the change in the items associated with each other, the strength of the link, and the like from the previous execution.

Figure 8:
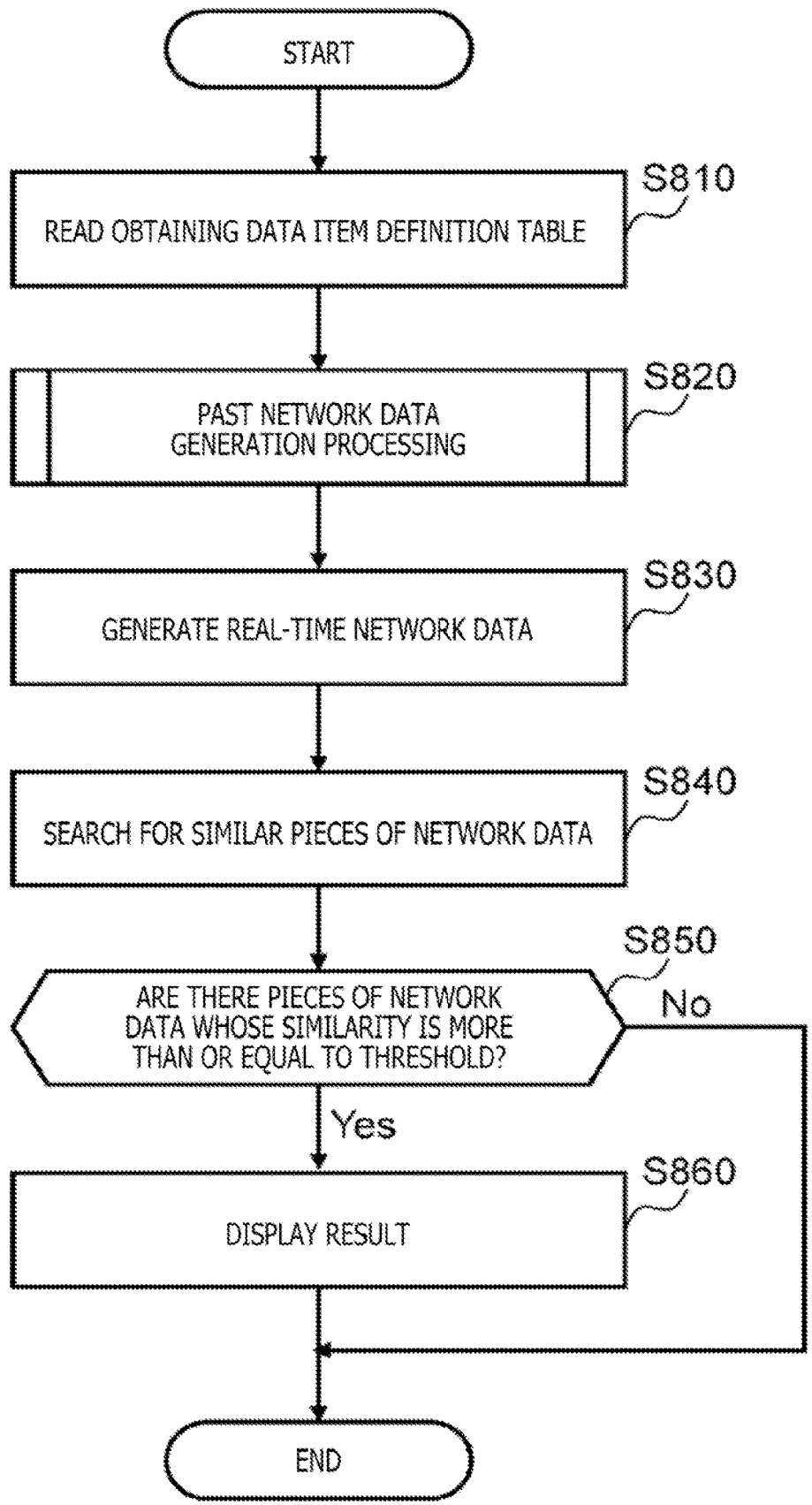
FIG. 8 is a diagram illustrating an example of a processing procedure relating to data association processing according to the first embodiment.

Next, the data association processing will be described with reference to FIG. 8. FIG. 8 is a diagram illustrating an example of a processing procedure relating to the data association processing.

First, the data obtaining unit 2212 reads the obtaining data item definition table 22A (step S810).

Subsequently, the past network data generation processing is performed based on the past data (step S820). In the past network data generation processing, past network data (data capable of generating the co-occurrence network graph or the correlation network graph relating to the past data) is generated. Note that the past network data generation processing will be described later with reference to FIG. 9.

Subsequently, the real-time relation identification unit 2214 obtains the real-time sensor data through the data obtaining unit 2212, and generates real-time network data (step S830). The real-time sensor data to be subjected to the data processing is a record whose type in the obtaining data definition table is the item "real time," and that is specified in the period. A real-time network data generation method is similar to step S960 and step S970 described later, and therefore description thereof is omitted.

Subsequently, the similarity calculation unit 2215 calculates similarities between one or more pieces of the past network data generated in step S820 and one or more pieces of the real-time network data generated in step S830 (step S840).

Herein, in a case of the co-occurrence relation, the similarity calculation unit 2215 searches for the network data in which the items (item IDs) of the start points of the links and the items (item IDs) of the end points of the links are the same (are respectively common) between the past network data and the real-time network data, and calculates a weight w of the link using the following expression.

$$w=(1/(\text{difference between co-occurrence values}+1))\times(1/(\text{difference between value levels of start points}+\text{difference between value levels of end points}+1))$$ [Expression 1]

For example, in a case where a co-occurrence value of the speed and the vibration calculated in step S820 is "0.4," the value range of the speed is "10 to 30 km/h," and the value range of the vibration is "50 to 70 mm," and a co-occurrence value of the speed and the vibration calculated in step S830 is "0.6," the value range of the speed is "10 to 30 km/h," and the value range of the vibration is "70 to 90 mm," the weight w turns "0.42" (1/(0.6−0.4+1))×(1/(0+1+1)) (rounding off to two decimal places).

Similarly, the similarity calculation unit 2215 calculates all weights of pieces of the network data in which the items of the start points of the links and the items of the end points of the links are the same, and a total sum of the calculated weights is used as the similarity.

With this configuration, the smaller the difference between the co-occurrence values, the larger the similarity, and the smaller the difference between the value ranges, the larger the similarity. With respect to common items between the items of the past network data generated in the past relation identification unit 2213 and the items of the real-time network data generated in the real-time relation Identification unit 2214, the weights between the common items are calculated, and a total sum of the calculated weights is calculated as the similarity, whereby the similarity can be calculated even in a case where the number of items is different between the real-time sensor data and the past data.

Furthermore, in a case of the correlation, the similarity calculation unit 2215 searches for pieces of the network data in which the items of the start points of the links and the items of the end points of the links are the same, similarly to the case of the co-occurrence relation, and calculates the weight (a reciprocal of ((difference between link values)+ 1)). For example, in a case where the correlation value of the speed and the vibration calculated in step S820 is "0.7," and the correlation value of the speed and the vibration calculated in step S830 is "0.5," the weight turns "0.83" (1/(0.7− 0.5+1)) (rounding off to two decimal places). Note that, also in the case of the correlation, the similarity calculation unit 2215 calculates all weights of pieces of the network data in which the items of the start points of the links and the items of the end points of the links are respectively the same, and a total sum of the calculated weights is used as the similarity.

With this configuration, the smaller the difference between the correlation values, the larger the similarity. Further, the similarity can be calculated even in a case where the number of items is different between the real-time sensor data and the past data.

Subsequently, the output controller 2216 checks whether the network data whose similarity is larger than or equal to a threshold (a combination of the past network data and the real-time network data) is present (step S850). The output controller 2216 shifts the processing to step S860 in a case where determination in which the network data whose similarity is larger than or equal to the threshold is present is made, and terminates the data association processing in a case where determination in which the network data whose similarity is larger than or equal to the threshold is not present is made.

In step S860, the output controller 2216 instructs the main controller 2211 to display the result of the data processing including, for example, the network graph in which the real-time sensor data and the job data are associated with each other in the result display section 1040 of the data analysis screen 1000, and then terminates the data association processing.

Figure 9:
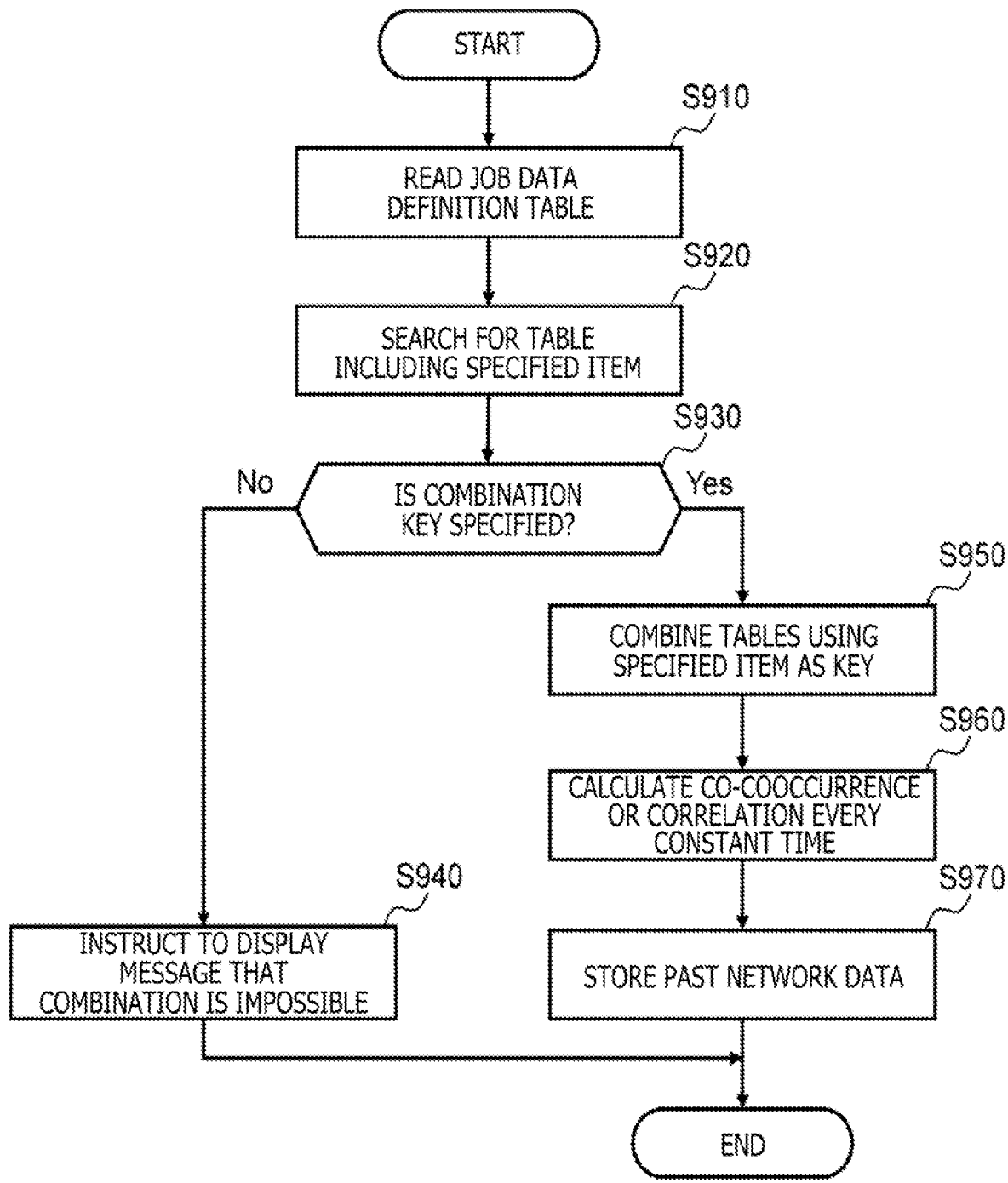
FIG. 9 is a diagram illustrating an example of a processing procedure relating to past network data generation processing according to the first embodiment.

Next, the past network data generation processing will be described with reference to FIG. 9. FIG. 9 is a diagram illustrating an example of a processing procedure relating to the past network data generation processing.

First, the data obtaining unit 2212 reads the job data definition table 223 (step S910).

Figure 11A:
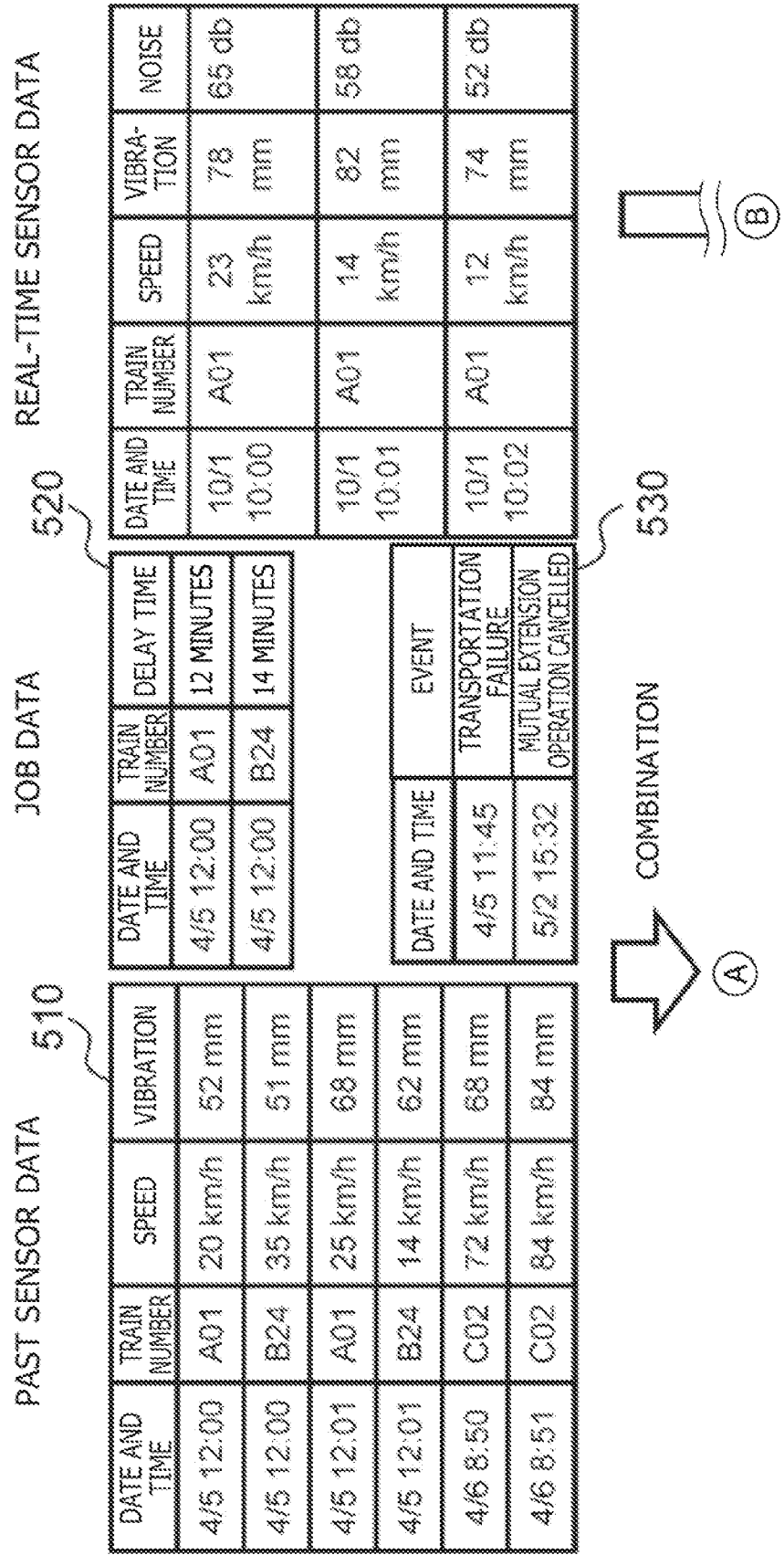
FIG. 11 is a diagram for explaining generation of network data according to the first embodiment.
Figure 11C:
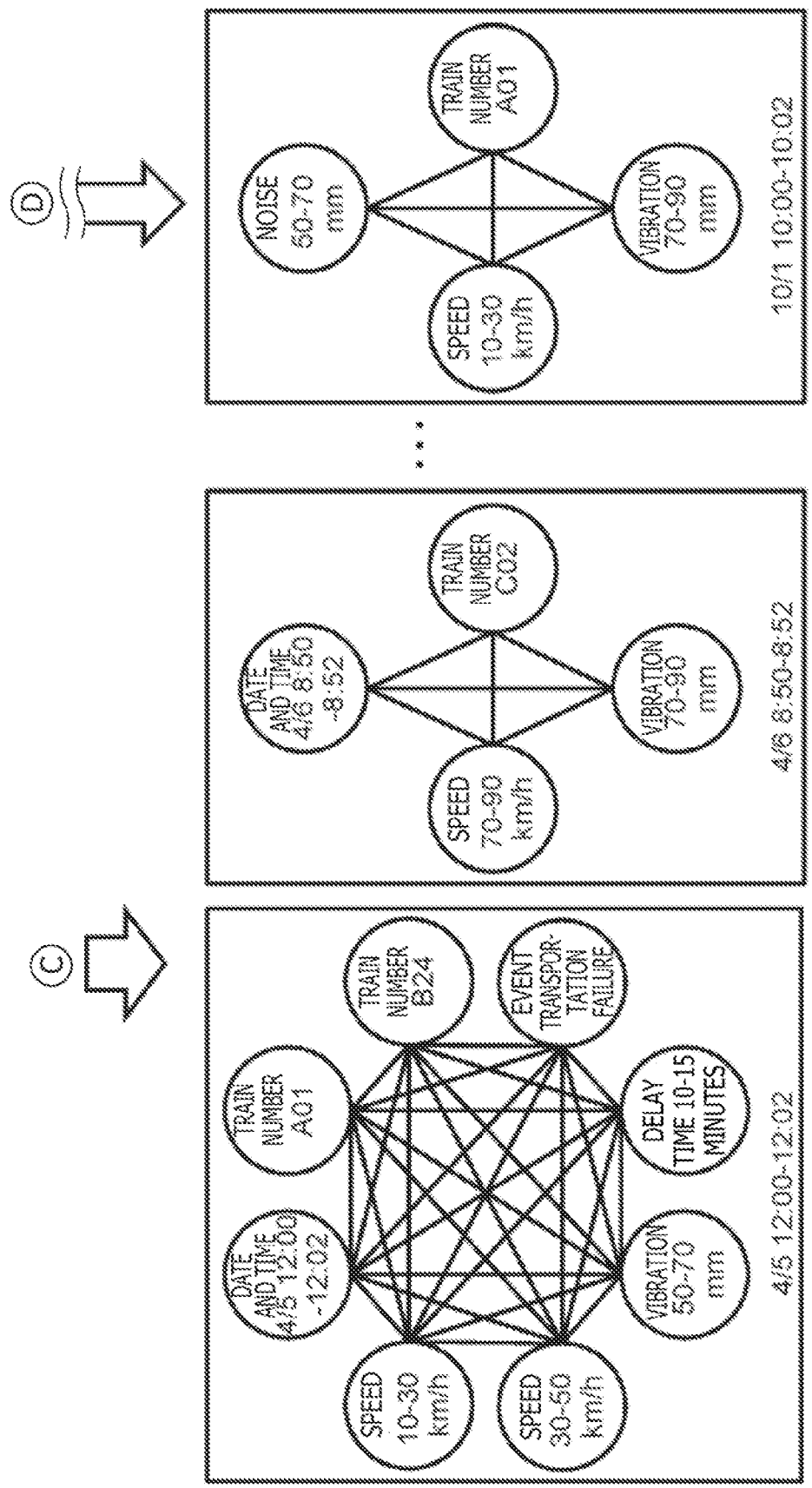

Subsequently, the past relation identification unit 2213 searches the past data table group 225 for a table including the item name whose type is registered as "past" in the obtaining data item definition table 224 (step S920). Hereinafter, as illustrated in FIG. 11, a case where the train sensor table 510 is searched with respect to the past sensor data, and the railway delay management table 520 and the operation management event table 530 are searched with respect to the job data will be described as an example.

Subsequently, the past relation identification unit 2213 refers to the job data definition table 223, and determines whether a record corresponding to a table name searched in step S920 is present (whether the combination key is specified) (step S930). The past relation identification unit 2213 determines that the tables cannot be combined and shifts the processing to step S940 in a case where determination in which the combination key is not specified (the record corresponding to the table name is not present) is made, and shifts the processing to step S950 in a case where determination in which the combination key is specified is made.

In step S940, the past relation identification unit 2213 instructs the output controller 2216 to display a message "With the specified item, the real-time sensor data cannot be associated with the job data." on the screen, and terminates the past network data generation processing. Note that the output controller 2216 instructs the main controller 2211 to display the above message on the result display section 1040 in the data analysis screen 1000 as the result of the data processing.

In step S950, the past relation identification unit 2213 combines the past sensor data table (past sensor data) with the job data table (job data) thus searched using the combination key.

For example, in the case of FIG. 11, the past relation identification unit 2213 combines the train sensor table 510 and the railway delay management table 520 using the date and time, and the train number as the key, and combines the train sensor table 510 and the operation management event table 530 using the date and time as the key, to generate a combination table 1100.

Herein, in general, recording times (recording frequency) of the job data are less than data sensing times (sensing frequency) of the sensing data, and the date and time of the record of the job data and the date and time of the record of the sensing data do not often coincide with each other. Therefore, it is considered that there are few records that can be combined directly. Then, when the time difference is within a range specified in the valid time of the job data definition table 223, the records are combined while taking the time in job data and the time in the sensor data are identical.

More specifically, the date and time of the operation management event table 530 is "4/5 11:45," and the date and time of the train sensor table 510 is "4/5 12:00" or "4/5

12:01," the date and time serving as the combination key, and thus they do not coincide with each other. However, the valid time is specified as 30 minutes, and therefore the record of the job data is combined with the record of the past sensor data of the date and time from "4/5 11:45" to "4/5 12:15." As described above, pieces of time information within the predetermined time width are taken as the identical time to combine the past sensor data and the job data, whereby the job data can be combined with the sensor data even when the data recording times (recording frequency) of the job data is few.

Subsequently, the past relation identification unit. 2213 calculates a data relation (the co-occurrence relation or the correlation) every constant time (step S960). Herein, the records in the tables combined in step S950 are divided into a plurality of record groups each of which has, for example, the date and time of each predetermined time (e.g., two minutes). Then, the co-occurrence relation or the correlation between the items is calculated for each group. For example, the past relation identification unit 2213 divides the data value into constant, ranges (e.g., in a case of the speed, into five range levels that are 0 to 20 km/h, 21 to 40 km/h, 41 to 60 km/h, 61 to 80 km/h, and 81 km/h or more, by 20 km/h). The past relation identification unit 2213 then calculates a support degree of association rule extraction (a ratio of transactions that simultaneously satisfy a condition and a conclusion, to all transactions) (calculates a co-occurrence relation). Further, for example, in a case where both data items are of pieces of numerical value data, the past relation identification unit 2213 calculates, for example, a Pearson's correlation coefficient or a Spearman's rank correlation coefficient (calculates a correlation).

In the case in FIG. 11, with respect to the number of items "6" in the combination table 1100, the past relation identification unit 2213 repeats the calculation of the co-occurrence relation with respect to round-robin combinations of "15 patterns (n(n−1)/2), where n indicates the number of items" and for each record group. Additionally, in a case where all data items are of pieces of numerical value data, the past relation identification unit 2213 repeats the calculation of the correlation.

Subsequently, the past relation identification unit 2213 stores the results calculated in step S960 into the network data table group 226 as the past network data indicating the co-occurrence relation or the correlation between the items (step S970), and terminates the past network data generation processing. Note that, in the network data table group 226, pieces of the past network data are stored into each record group in step S960.

It should be noted that, as described above, the real-time relation identification unit 2214 also performs the processing in step S960 and step S970. In this case, since the date and time of the past data and the date and time of the real-time sensor data are different from each other as a matter of course, in the generation of the real time network data, the real-time relation identification unit 2214 does not set the date and time as the node. Further, the example in which the train number is set as the node is illustrated in, for example, FIG. 6 and FIG. 11, but the train number may not be set as the node. By not setting the train number as the node, a train similarly having a predetermined trend (a trend such as large vibration or large noise even with a large speed) can be processed even when the train is different.

Next, a display method of the association result will be described with reference to FIG. 10.

For example, the output controller 2216 instructs the main controller 2211 to display pieces of the real-time network data whose similarities are more than or equal to the threshold, which are selected in step S850, and display pieces of the past network data subjected to the calculation of the similarity while being overlapped thereon. At this time, the output unit 240 displays the items of the real-time sensor data and the items of the job data in a discriminable manner. For example, as illustrated in FIG. 10, to make clear that the items of the real-time sensor data and the items of the job data are different kinds of data, display forms of the icons such as colors or shapes are displayed in different forms. With such display forms, the data analyzing person can quickly and accurately grasp the items of the real-time sensor data and the items of the job data.

For example, in a case where the number of pieces of information to be displayed is more than the predetermined number, or in a case where the pieces of information to be displayed do not fall within one screen, the output controller 2216 may limit the pieces of information to be displayed.

For example, with respect to the past network data, the nodes of links in which the co-occurrence values (or the correlation values) are higher (e.g., ten pieces from the highest) way be displayed. This allows pieces of information that are highly relevant to each other to be grasped more quickly.

For example, in a case where there are a plurality of pieces of network data each of which is more than or equal to the threshold, the pieces of network data to be displayed may be limited within the constant number in descending order of the similarity from the highest.

The output controller 2216 may differentiate display forms of lines connecting the items, such as colors, shapes, and thicknesses, according to strength of a data relation (the correlation or the co-occurrence relation) to display. In this manner, the display forms of the links indicating the connection between the items are differentiated to be displayed, based on the strength (the co-occurrence value or the correlation value) of the connection between the items calculated by the past relation identification unit 2213 and the strength (the co-occurrence value or the correlation value) of the connection between the items calculated by the real-time relation identification unit 2214. This allows the data analyzing person to quickly and accurately grasp the relevance of the data.

Herein, with respect to the co-occurrence relation, in a case where there are pieces of sensor data having different value ranges between the real-time sensor data and the past sensor data even with the identical item name, strength of a link between this item and an item of the job data in which the link is connected to this item may be calculated by multiplying strength of a link between the past sensor data and the job data of this item, by a reciprocal of the difference between the range levels of the values. With this configuration, the larger the difference between the range levels of the values, the lower the strength of the link can be.

With the above-described configuration, in the system using the real-time sensor data, when a change occurs in the data relation (the co-occurrence relation or the correlation) between the items, a cause of the change can be easily estimated from the past job data, whereby efficiency of the analysis operation can be enhanced.

Note that, the present embodiment has been described using the example of the train data, but is not limited thereto. The present embodiment may be applied to data in another job field. The present invention relates to a method and a device that perform data processing in a system configured with an information processing device such as a personal computer, a workstation, a server, a mobile computer, a mobile phone, an in-vehicle terminal, an IC card, and a sensor. The present invention can be used in ail fields that perform data processing using sensor data capable of obtaining in real time and job data.

(2) Other Embodiments

It should be noted that, in the above-described embodiment, a case where the present invention is applied to the data processing system 1 has been described, but the present invention is not limited thereto, and can widely be applied to, for example, various kinds of data processing systems, data processing devices, and data processing methods.

In the above-described embodiment, the case that monitors the state of the train in real time has been described as an example. However, the present invention is not limited thereto, and may be applied to a case that monitors a state of equipment in a factory in real time, may be applied to a case that monitors a state of a storage device in real time, or may be applied to other cases. The present invention can be applied to all cases each of which monitors a state of a predetermined target in real time.

For convenience of description, in the above-described embodiment, various kinds of data are described using xx tables, but a data structure is not limited, and may be expressed as xx information, for example.

In the above-description, the information such as the program that implements each function, the tables, and the data may be stored in a storage device such as a memory, a hard disk, and an SSD (Solid State Drive), or a recording medium such as an IC card, an SD card, and a DVD.

The above-described configuration may be changed, rearranged, combined, or omitted as appropriate without departing from the gist of the present invention.

DESCRIPTION OF REFERENCE CHARACTERS

1: Data processing system
110: Sensor
120: Data processing device
150: Edge server
160: Job server
2211: Main controller
2212: Data obtaining unit
2213: Past relation identification unit
2214: Real-time relation identification unit
2215: Similarity calculation unit
2216: Output controller

The invention claimed is:

1. A data processing device comprising:
a past relation identification unit that combines past sensor data of a train with job data associated with the train based on information on an item relating to data combination as specified through a data analysis interface, and identifies a data relation between items based on an item of the past sensor data and an item of the job data, the information comprising date, time, and train number;
a real-time relation identification unit that identifies a data relation between items of real-time sensor data received from the train based on a selection for real-time data through the data analysis interface;
a similarity calculation unit that calculates a similarity between the data relation identified by the past relation identification unit and the data relation identified by the real-time relation identification unit; and
an output controller that outputs the data relation identified by the past relation identification unit and the data relation identified by the real-time relation identification unit while associating with each other by the item of the past sensor data and the item of the real-time sensor data, the similarity between the data relation identified by the past relation identification unit and the data relation identified by the real-time relation identification unit exceeding a threshold, the similarity being calculated by the similarity calculation unit;
the similarity calculation unit calculates weights between items common to the items of the data relation identified by the past relation identification unit and the items of the data relation identified by the real-time relation identification unit, and calculates a total sum of the calculated weights as the similarity;
the output controller displays, on a display device, the data relation identified by the past relation identification unit and the data relation identified by the real-time relation identification unit while allowing the items of the job data and the items of the real-time sensor data to be discriminated.

2. The data processing device according to claim 1, wherein the past relation identification unit combines the past sensor data with the job data by taking pieces of time information present in a predetermined time width as an identical time.

3. The data processing device according to claim 1, wherein
the past relation identification unit calculates a co-occurrence value between the items based on the past sensor data and the job data,
the real-time relation identification unit calculates a co-occurrence value between the items based on the real-time sensor data, and
the similarity calculation unit calculates the similarity based on a value range indicating the co-occurrence value calculated by the past relation identification unit and a range of the value, and a value range indicating the co-occurrence value calculated by the real-time relation identification unit and a range of the value.

4. The data processing device according to claim 1, wherein
the real-time sensor data is obtained every predetermined time, and
in a case where information relating to the items to be displayed is changed between first real-time sensor data and second real-time sensor data that is obtained subsequent to the first real-time sensor data, the output controller highlights the changed information.

5. The data processing device according to claim 1, wherein
the past relation identification unit calculates a value indicating strength of connection between the items based on the past sensor data and the job data,
the real-time relation identification unit calculates a value indicating strength of connection between the items based on the real-time sensor data, and
the output controller differentiates a display form of a link indicating the connection between the items to display, based on the strength of the connection between the items calculated by the past relation identification unit, and on the strength of the connection between the items calculated by the real-time relation identification unit.

6. A data processing method comprising:
a first step of, by a past relation identification unit, combining past sensor data of a train with job data associated with the train based on information on an item relating to the data combination as specified through a data analysis interface, and identifying a data relation between items based on an item of the past sensor data and an item of the job data, the information comprising date, time, and train number;

a second step of, by a real-time relation identification unit, identifying a data relation between items of real-time sensor data received from the train based on a selection for real-time data through the data analysis interface;

a third step of, by a similarity calculation unit, calculating a similarity between the data relation identified by the past relation identification unit and the data relation identified by the real-time relation identification unit; and a fourth step of, by an output controller, outputting the data relation identified by the past relation identification unit and the data relation identified by the real-time relation identification unit while associating with each other by the item of the past sensor data and the item of the real-time sensor data, the similarity between the data relation identified by the past relation identification unit and the data relation identified by the real-time relation identification unit exceeding a threshold, the similarity being calculated by the similarity calculation unit;

wherein the similarity calculation unit calculates weights between items common to the items of the data relation identified by the past relation identification unit and the items of the data relation identified by the real-time relation identification unit, and calculates a total sum of the calculated weights as the similarity;

wherein the output controller displays, on a display device, the data relation identified by the past relation identification unit and the data relation identified by the real-time relation identification unit while allowing the items of the job data and the items of the real-time sensor data to be discriminated.

* * * * *